US008027973B2

(12) United States Patent
Cao et al.

(10) Patent No.: US 8,027,973 B2
(45) Date of Patent: *Sep. 27, 2011

(54) SEARCHING QUESTIONS BASED ON TOPIC AND FOCUS

(75) Inventors: Yunbo Cao, Beijing (CN); Chin-Yew Lin, Beijing (CN)

(73) Assignee: Microsoft Corporation, Redmond, WA (US)

( * ) Notice: Subject to any disclaimer, the term of this patent is extended or adjusted under 35 U.S.C. 154(b) by 532 days.

This patent is subject to a terminal disclaimer.

(21) Appl. No.: 12/185,713

(22) Filed: Aug. 4, 2008

(65) Prior Publication Data

US 2010/0030770 A1 Feb. 4, 2010

(51) Int. Cl.
*G06F 17/30* (2006.01)
*G06F 7/00* (2006.01)
(52) U.S. Cl. ...................................... 707/728
(58) Field of Classification Search .................. 707/999.001–999.005, 728
See application file for complete search history.

(56) References Cited

U.S. PATENT DOCUMENTS

| 5,802,493 | A   |   | 9/1998  | Sheflott et al.   |         |
|-----------|-----|---|---------|-------------------|---------|
| 6,028,601 | A   | * | 2/2000  | Machiraju et al.  | 715/705 |
| 6,377,945 | B1  |   | 4/2002  | Risvik et al.     |         |
| 6,665,666 | B1  |   | 12/2003 | Brown et al.      |         |
| 6,755,662 | B2  |   | 6/2004  | Fujino et al.     |         |
| 6,804,670 | B2  |   | 10/2004 | Kreulen et al.    |         |
| 7,231,384 | B2  |   | 6/2007  | Wu et al.         |         |
| 7,346,614 | B2  |   | 3/2008  | Hasida et al.     |         |
| 7,349,899 | B2  | * | 3/2008  | Namba             | 707/999.006 |
| 2002/0087520 | A1 | * | 7/2002 | Meyers            | 707/999.003 |
| 2002/0111934 | A1 | * | 8/2002 | Narayan           | 707/999.001 |
| 2004/0251917 | A1 |   | 12/2004 | Blanchard         |         |
| 2006/0078862 | A1 |   | 4/2006  | Goto et al.       |         |
| 2006/0136455 | A1 | * | 6/2006 | Wen et al.        | 707/999.101 |
| 2006/0206472 | A1 |   | 9/2006  | Masuichi et al.   |         |
| 2007/0005566 | A1 |   | 1/2007  | Bobick et al.     |         |
| 2007/0022109 | A1 |   | 1/2007  | Imielinski et al. |         |
| 2007/0136248 | A1 |   | 6/2007  | Sarid et al.      |         |
| 2008/0005075 | A1 |   | 1/2008  | Horvitz et al.    |         |
| 2008/0228738 | A1 | * | 9/2008 | Li                | 707/999.003 |
| 2008/0288454 | A1 | * | 11/2008 | Swadi             | 707/999.003 |
| 2010/0030769 | A1 |   | 2/2010  | Cao et al.        |         |

OTHER PUBLICATIONS

Jeon et al., "Finding Similar Questions in Large Question and Answer Archives,"CIKM'05, Oct. 31-Nov. 5, 2005, Bremen, Germany 84-90 pages.*
"Questions Search," http://nces.ed.gov/naep3/itmrls/startsearch.asp., 1 page, [Internet accessed May 21, 2008].
"SearchAQuestion," http://searchaquestion.com, 2008, 1 page, [Internet accessed May 21, 2008].

(Continued)

*Primary Examiner* — Sathyanarayan Pannala
(74) *Attorney, Agent, or Firm* — Perkins Coie LLP (57) ABSTRACT

A method and system for determining the relevance of questions to a queried question based on topics and focuses of the questions is provided. A question search system provides a collection of questions with topics and focuses. Upon receiving a queried question, the question search system identifies a queried topic and queried focus of the queried question. The question search system generates a score indicating the relevance of a question of the collection to the queried question based on a language model of the topic of the question and a language model of the focus of the question.

20 Claims, 9 Drawing Sheets

OTHER PUBLICATIONS

Brown et al., "The Mathematics of Statistical Machine Translation: Parameter Estimation," Computational Linguistics vol. 19, No. 2, 1993, 263-311.

Burke et al., "Question Answering from Frequently-Asked Question Files: Experiences with the FAQ Finder System," The University of Chicago, Technical Report TR-97-05, Jun. 1997, pp. 1-37.

Cao et al., "Base Noun Phrase Translation Using Web Data and the EM Algorithm," International Conference on Computational Linguistics, 2002, 7 pages.

Fredkin, "Trie Memory," Communication of the ACM, vol. 3, Issue 9, Sep. 1960, pp. 490-499.

Galea, "Open-Domain Surface-Based Question Answering System," CSAW 2003, pp. 58-63.

Hermjakob et al., "Natural Language Based Reformulation Resource and Web Exploitation for Question Answering," Proceedings of TREC 2002, 9 pages.

Jeon et al., "Finding Semantically Similar Questions Based on Their Answers," SIGIR'05, Aug. 15-19, 2005, Salvador, Brazil, 2 pages.

Jeon et al., "Finding Similar Questions in Large Question and Answer Archives," CIKM'05, Oct. 31-Nov. 5, 2005, Bremen, Germany, pp. 84-90.

Lai et al., "FAQ Mining via List Detection," International Conference on Computational Linguistics, 2002, pp. 1-7.

Li et al., "Generalizing Case Frames Using a Thesaurus and the MDL Principle," Computational Linguistics vol. 24, No. 2, 1998, pp. 217-244.

Metzler et al., "Analysis of Statistical Question Classification for Fact-based Questions," Journal of Information Retrieval, 2003, pp. 1-29.

Pasca et al., "High Performance Question/Answering," SIGIR'01, Sep. 9-12, New Orleans, Louisiana, pp. 366-374.

Ponte et al., "A Language Modeling Approach to Information Retrieval," ACM SIGIR, 1998, pp. 275-281.

Rissanen, "Modeling by shortest data description," Automatica, vol. 14, 1978, pp. 465-471.

Salton et al., "A Vector Space Model for Automatic Indexing," Cornell University, Communications of the ACM, Nov. 1975, vol. 18, No. 11, pp. 613-620.

Sneiders, "Automated question answering using question templates that cover the conceptual model of the database," In Proc. of the 6th International Conference on Applications of Natural Language to Information Systems, 2002, pp. 235-239.

Voorhees, "Overview of the TREC 2004 Question Answering Track," TREC 2004, 11 pages.

Xue, Xiaobing et al., "Retrieval Models for Question and Answer Archives," SIGIR 2008, Jul. 20-24, 2008, Singapore, 8 pages.

"WordNet: A Lexical Database for English," http://wordnet.princeton.edu/, Copyright 2010, 3 pages, [Internet accessed Oct. 11, 2010].

* cited by examiner

SEARCHING QUESTIONS BASED ON TOPIC AND FOCUS

CROSS-REFERENCE TO RELATED APPLICATION

This application relates to U.S. patent application Ser. No. 12/185,702, filed on Aug. 4, 2008, entitled "CLUSTERING QUESTION SEARCH RESULTS BASED ON TOPIC AND FOCUS," which is hereby incorporated by reference in its entirety.

BACKGROUND

Many search engine services, such as Google and Live Search, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service may generate a relevance score to indicate how relevant the information of the web page may be to the search request based on the closeness of each match, web page importance or popularity (e.g., Google's PageRank), and so on. The search engine service then displays to the user links to those web pages in an order that is based on a ranking that may be determined by their relevance, popularity, or some other measure.

Some online services, such as Yahoo! Answers and Live Search QnA, have created large collections of questions and their corresponding answers. These Q&A services may provide traditional frequently asked question ("FAQ") services or may provide community-based services in which members of the community contribute both questions and answers to those questions. These Q&A services provide a mechanism that allows users to search for previously generated answers to previously posed questions. These Q&A services typically input a queried question from a user, identify questions of the collection that relate to the queried question (i.e., a question search), and return the answers to the identified questions as the answer to the queried question.

Such Q&A services typically treat the questions as plain text. The Q&A services may use various techniques, including a vector space model and a language model, when performing a question search. Table 1 illustrates example results of a question search for a queried question.

TABLE 1

| Queried Question: |
| --- |
| Q1: Any cool clubs in Berlin or Hamburg? |
| Expected Question |
| Q2: What are the best/most fun clubs in Berlin? |

TABLE 1-continued

| Not Expected Question: |
| --- |
| Q3: Any nice hotels in Berlin or Hamburg? |
| Q4: How long does it take to get to Hamburg from Berlin? |
| Q5: Cheap hotels in Berlin? |

Such Q&A services may identify questions Q2, Q3, Q4, and Q5 as being related to queried Question Q1. The Q&A services typically cannot determine, however, which identified question is most related to the queried question. In this example, question Q2 is most closely related to queried question Q1.

SUMMARY

A method and system for determining the relevance of questions to a queried question based on topics and focuses of the questions is provided. A question search system provides a collection of questions with topics and focuses. The topic of a question represents the major context/constraint of a question that characterizes the interest of the user who submits the question. The focus of a question represents certain aspects or descriptive features of the topic of the question in which the user is interested. Upon receiving a queried question, the question search system identifies a queried topic and queried focus of the queried question. The question search system generates a score indicating the relevance of a question of the collection to the queried question based on a language model of the topic of the question and a language model of the focus of the question.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for determining the relevance of questions to a queried question based on topics and focuses of the questions is provided. In some embodiments, a question search system provides a collection of questions. Each question of the collection has an associated topic and focus. The topic of a question represents the major context/constraint of a question that characterizes the interest of the user who submits the question. For example, the question "Any cool clubs in Berlin or Hamburg?" has the topic of "Berlin Hamburg" (removing stop words). The focus of a question represents certain aspects or descriptive features of the topic of the question in which the user is interested. For example, the sample question has the focus of "cool clubs," which describes, refines, or narrows the user's interest in the topic of the question. Upon receiving a queried question, the question search system identifies a queried topic and queried focus of the queried question. The question search system generates a score indicating the relevance of a question of the collection to the queried question based on a language model of the topic of the question and a language model of the focus of the question. The question search system may generate a score for each question or a subset of questions in the collection, and the question with the highest score may be considered to be the most relevant question to the queried question. The determination of the relevance of a question to a queried question may be used in Q&A searching and may be used in document searching such as by a web search service that searches for web pages.

In some embodiments, the question search system identifies the topics and focuses of a collection of questions using a minimum description length ("MDL") tree cut model. Such identification of topics and focuses is described in U.S. patent application Ser. No. 12/098,457, entitled "Recommending Questions to Users of Community Question Answering," and filed on Apr. 7, 2008 which is hereby incorporated by reference. A "cut" of a tree is any set of nodes in the tree that defines the partition of all nodes viewing each node as representing a set of its child nodes as well as itself. The question search system generates a "question tree" for questions of the collection by identifying base noun phrases and WH-ngrams of the question. A base noun phrase is a simple and non-recursive noun phrase, and a WH-ngram is an n-gram beginning with the WH-words: when, what, where, which, and how. The question search system calculates the specificity of a term (e.g., base noun phrase or WH-word) to indicate how well the term characterizes the information needs of users who posts a question. The question search system then generates a topic chain for each question, which is a list of the terms of a question ordered from highest to lowest specificity. For example, the topic chain of the question "Any cool clubs in Berlin or Hamburg?" may be "Hamburg→Berlin→cool club" because the specificity for Hamburg, Berlin, and cool club may be 0.99, 0.62, and 0.36, respectively. The topic chains for the questions of Table 1 are illustrated in Table 2.

TABLE 2

Queried Question:

Q1: Hamburg→Berlin→cool club
Expected Question

Figure 1:
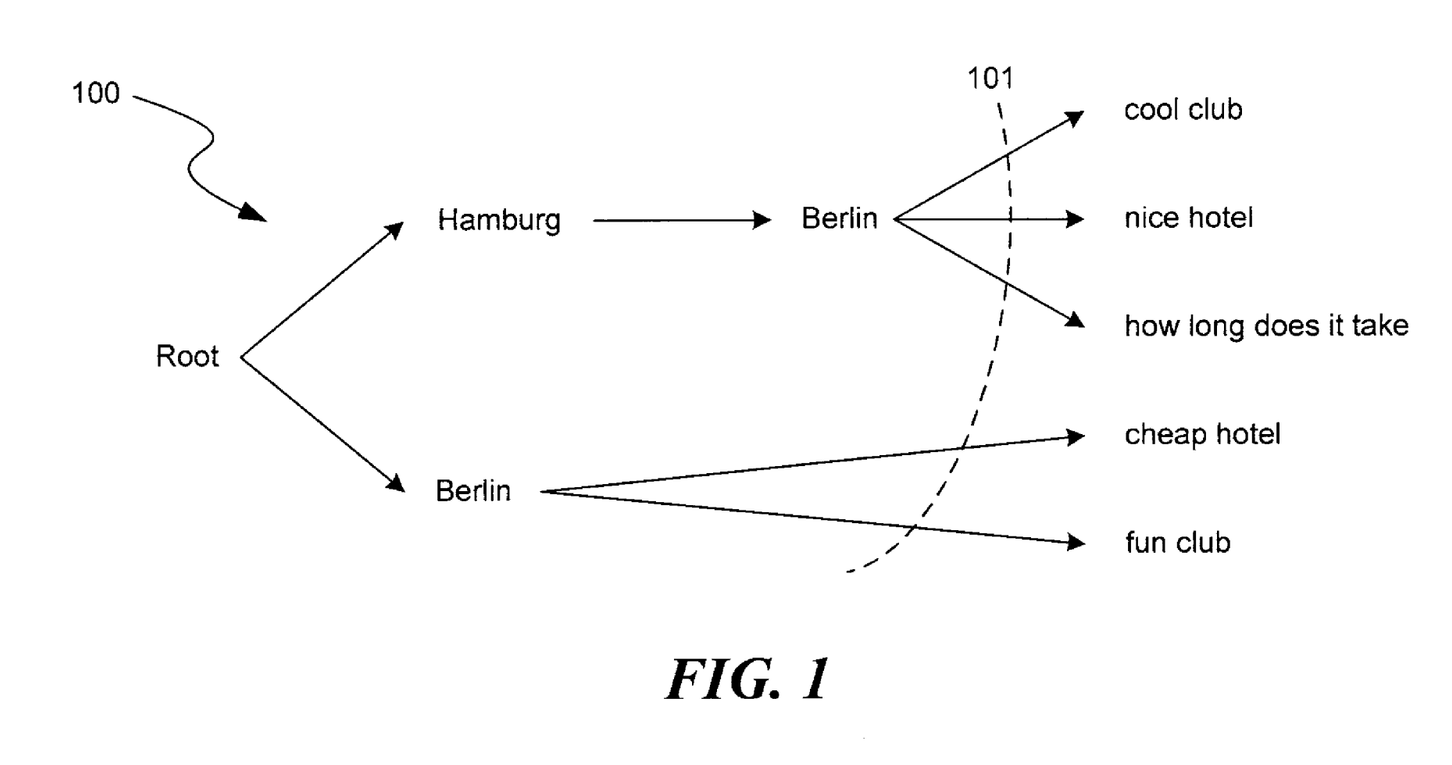
FIG. 1 is a diagram that illustrates an example question tree.

Q2: Berlin→fun club
Not Expected Question:

Q3: Hamburg→Berlin→nice hotel
Q4: Hamburg→Berlin→how long does it take
Q5: Berlin→cheap hotels FIG. 1 is a diagram that illustrates an example question tree. A question tree 100 represents the topic chains of Table 2. The connected nodes of Hamburg, Berlin, and cool club represent the topic chain of "Hamburg→Berlin→cool club." The cut of the question tree is represented by a dashed line 101. The terms before (to the left of) the cut represent the topics, and the terms after (to the right on the cut represent the focuses. The topic of the question "Any cool clubs in Berlin or Hamburg?" is thus "Hamburg Berlin," and focus of that question is "cool club."

The question search system represents the relevance of a question $\tilde{q}$ to a queried question q by the probability $p(q|\tilde{q})$ of generating the queried question q from a language model formed by the question $\tilde{q}$. The question $\tilde{q}$ is from a collection C of questions. The probability is a score indicating the relevance of the question $\tilde{q}$ to the queried question q. The question search system may represent the probability with the following equation:

$$p(q \mid \tilde{q}) = \lambda \cdot p(T(q) \mid T(\tilde{q})) + (1 - \lambda) \cdot p(F(q) \mid F(\tilde{q})) \quad (1)$$

where $p(T(q)|T(\tilde{q}))$ represents a topic probability of generating terms of the queried topic $T(q)$ from a language model of the topic $T(\tilde{q})$, $p(F(q)|F(\tilde{q}))$ represents a focus probability of generating terms of the queried focus $F(q)$ from a language model of the focus $F(\tilde{q})$, and $\lambda$ represents a weight for a weighted linear combination of the topic probability and the focus probability. One skilled in the art will appreciate that the topic probability and the focus probability may alternatively be combined in a non-linear manner.

The question search system uses traditional language modeling to represent a single multinomial model $p(t|\tilde{q})$ over terms t that are estimated for each question $\tilde{q}$. The question system uses two such multinomial models $p(t|T(\tilde{q}))$ and $p(t|F(\tilde{q}))$ to estimate the topic probability and focus probability for each question $\tilde{q}$. In some embodiments, the question search system may use a unigram language model. However, a bi-gram, tri-gram, or more generally an n-gram language model may be used. The question search system represents Equation 1 using a unigram language model with the following equation:

$$p(q \mid \tilde{q}) = \lambda \cdot \prod_{t \in T(q)} p(t \mid T(\tilde{q})) + (1 - \lambda) \cdot \prod_{t \in F(q)} p(t \mid F(\tilde{q})) \quad (2)$$

To avoid zero probabilities and to estimate more accurate language models, the question search system may smooth out the topics and focuses of questions using a language model based on the entire collection of questions. The question search system represents the smoothed-out probabilities with the following equations:

$$p(t \mid H(\tilde{q})) = \alpha \cdot \hat{p}(t \mid T(\tilde{q})) + (1 - \alpha) \cdot \hat{p}(t \mid C) \quad (3)$$

$$p(t \mid T(\tilde{q})) = \beta \cdot \hat{p}(t \mid F(\tilde{q})) + (1 - \beta) \cdot \hat{p}(t \mid C) \quad (4)$$

where $\hat{p}(t|T(\tilde{q}))$, $\hat{p}(t|F(\tilde{q}))$, and $\hat{p}(t|C)$ are maximum likelihood estimation ("MLE") estimators with respect to the topic of question $\tilde{q}$, the focus of question $\tilde{q}$, and the collection (or corpus) C and where α and β represents weights for a linear combination of the terms of the equations.

The question search system also attempts to account for the "lexical chasm" between questions. A "lexical chasm" occurs when two questions that have the same meaning use very different wording. For example, the questions "where to stay in Hamburg?" and "the best hotel in Hamburg?" have almost the same meaning but are lexically different in their focus. The focus "where to stay" has no word in common with the focus "best hotel." A mixture model for fixing the lexical chasm between questions is described in Jeon, J., and Croft, W. B., "Learning Translation-Based Language Models using Q&A Archives," Technical Report, University of Massachusetts (2007). The model is a combination of the language modeling approach (for information retrieval) and the translation-based approach (for information retrieval).

The question search system may be extended to use a translation-based model. The question search system would then represent Equations 3 and 4 with the following equations:

$$p(t \mid T(\tilde{q})) = \alpha_1 \cdot \hat{p}(t \mid T(\tilde{q})) + \alpha_2 \cdot \sum_{t' \in T(q)} Tr(t \mid t') \cdot \hat{p}(t' \mid T(\tilde{q})) + (1 - \alpha_1 - \alpha_2) \cdot \hat{p}(t \mid C) \quad (5)$$

$$p(t \mid F(\tilde{q})) = \beta_1 \cdot \hat{p}(t \mid F(\tilde{q})) + \beta_2 \cdot \sum_{t' \in F(q)} Tr(t \mid t') \cdot \hat{p}(t' \mid F(\tilde{q})) + (1 - \beta_1 - \beta_2) \cdot \hat{p}(t \mid C) \quad (6)$$

where Tr(t|t') represents the probability that term t is the translation of t'. The question search system may estimate the probability Tr(t|t') based on the collections of question titles and question descriptions as a parallel corpus and the IBM model 1 as the alignment model, as described in Brown, P. F., Pietra, V. J. D., Pietra, S. A. D., and Mercer R. L., "The Mathematics of Statistical Machine Translation: Parameter Estimation," Computing Linguistics, 19(2):263-311 (1993). Conceptually, the question descriptions represent user reiterations or paraphrasings of the question titles. The alignment model is used to align the question titles with words used in the question descriptions.

Figure 2:
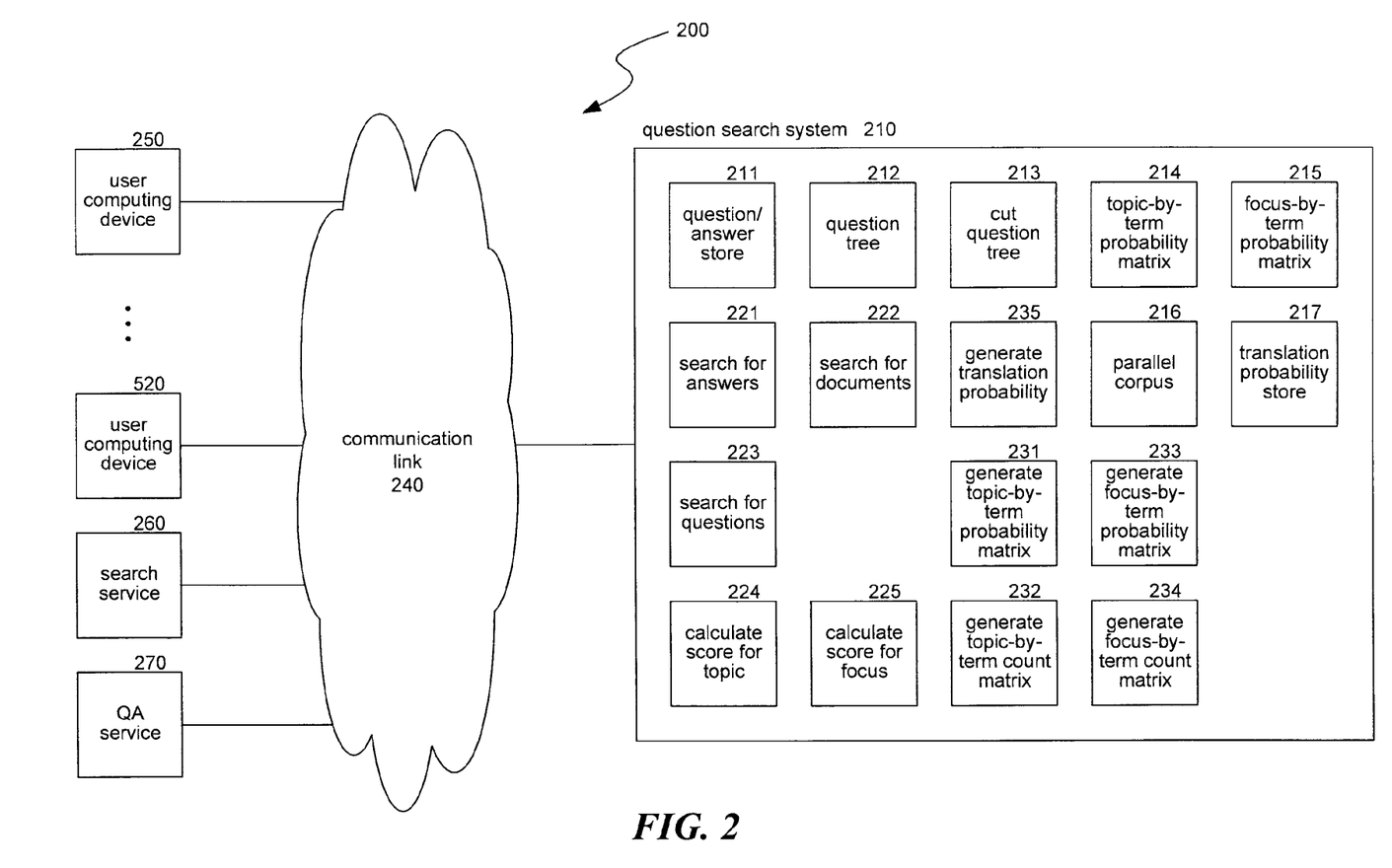
FIG. 2 is a block diagram illustrating components of a question search system in some embodiments.

FIG. 2 is a block diagram illustrating components of a question search system in some embodiments. A question search system 210 may be connected to user computing devices 250, a search service 260, and a Q&A service 270 via a communication link 240. The question search system includes various data stores including a question/answer store 211, a question tree store 212, a cut question tree store 213, a topic-by-term probability matrix store 214, a focus-by-term probability matrix store 215 a parallel corpus store 216, and a translation probability store 217. The question/answer store 211 contains questions and their corresponding answers. The question tree store 212 contains a question tree for the questions of the question/answer store. The cut question tree store 213 indicates the cut of the question tree. The topic-by-term probability matrix store 214 contains the probability of each term being generated from a language model of the corresponding topic. The focus-by-term probability matrix store 215 contains the probability of each term being generated from a language model of the corresponding focus. The parallel corpus store 216 contains question titles and question descriptions used to generate translation probabilities. The translation probability store 217 contains the translation probabilities for the terms in the parallel corpus.

The question search system 210 also includes a search for answers component 221, a search for documents component 222, a search for questions component 223, a calculate score for topic component 224, and a calculate score for focus component 225. The search for answers component 221 identifies questions of the question/answer store 211 that are relevant to a queried question and selects the answers corresponding to the identified questions as results for the queried question. The search for documents component 222 identifies questions of the question/answer store 211 that are relevant to a queried question, uses the identified questions to search for documents (e.g., web pages), and uses these search results as the search results for the queried question. The search for questions component 223 calculates probabilities that the queried question can be generated by language models of the questions of the question/answer store 211 based on language models for the topics and focuses. The calculate score for topic component 224 and the calculate score for focus component 225 calculate probabilities for the topic and focus, respectively.

The question search system 210 also includes components to generate initial probabilities such as a generate topic-by-term probability matrix component 231, a generate topic-by-term count matrix component 232, a generate focus-by-term probability matrix component 233, a generate focus-by-term count matrix component 234, and a generate translation probability component 235. The generate topic-by-term probability matrix component 231 generates the probabilities for the topic-by-term probability matrix 214, by invoking the generate topic-by-term count matrix component 232, to generate counts of the terms within the topics. The generate focus-by-term probability matrix component 233 and the generate focus-by-term count matrix component 234 function in an analogous manner to the corresponding topic components. The generate translation probability component 235 calculates the probability of a term being a translation of another term based on the question titles and question descriptions in the parallel corpus store 216.

Figure 9:
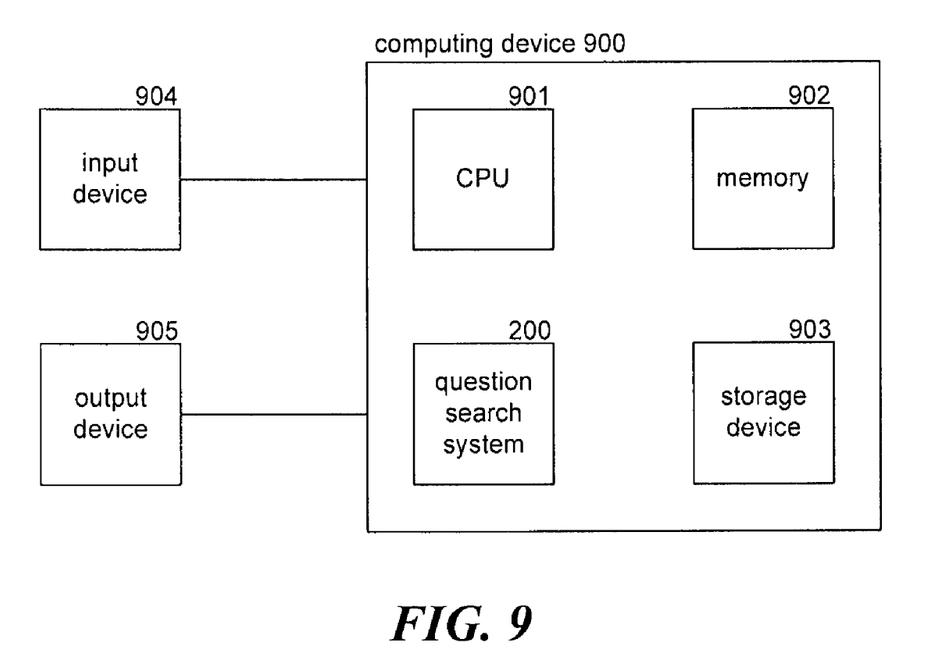
FIG. 9 is a block diagram of a computing device on which the question search system may be implemented.

FIG. 9 is a block diagram of a computing device on which the question search system may be implemented. The computing device 900 on which the question search system 200 may be implemented may include a central processing unit 901, memory 902, input devices 904 (e.g., keyboard and pointing devices), output devices 905 (e.g., display devices), and storage devices 903 (e.g., disk drives). The memory and storage devices are computer-readable media that may contain instructions that implement the question search system. In addition, the data structures and message structures may be stored or transmitted via a data transmission medium, such as a signal on a communications link. Various communications links may be used, such as the Internet, a local area network, a wide area network, or a point-to-point dial-up connection.

The question search system may be implemented in and/or used by various operating environments. The operating environment described herein is only one example of a suitable operating environment and is not intended to suggest any limitation as to the scope of use or functionality of the relevance system. Other well-known computing systems, environments, and configurations that may be suitable for use include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The question search system may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Figure 3:
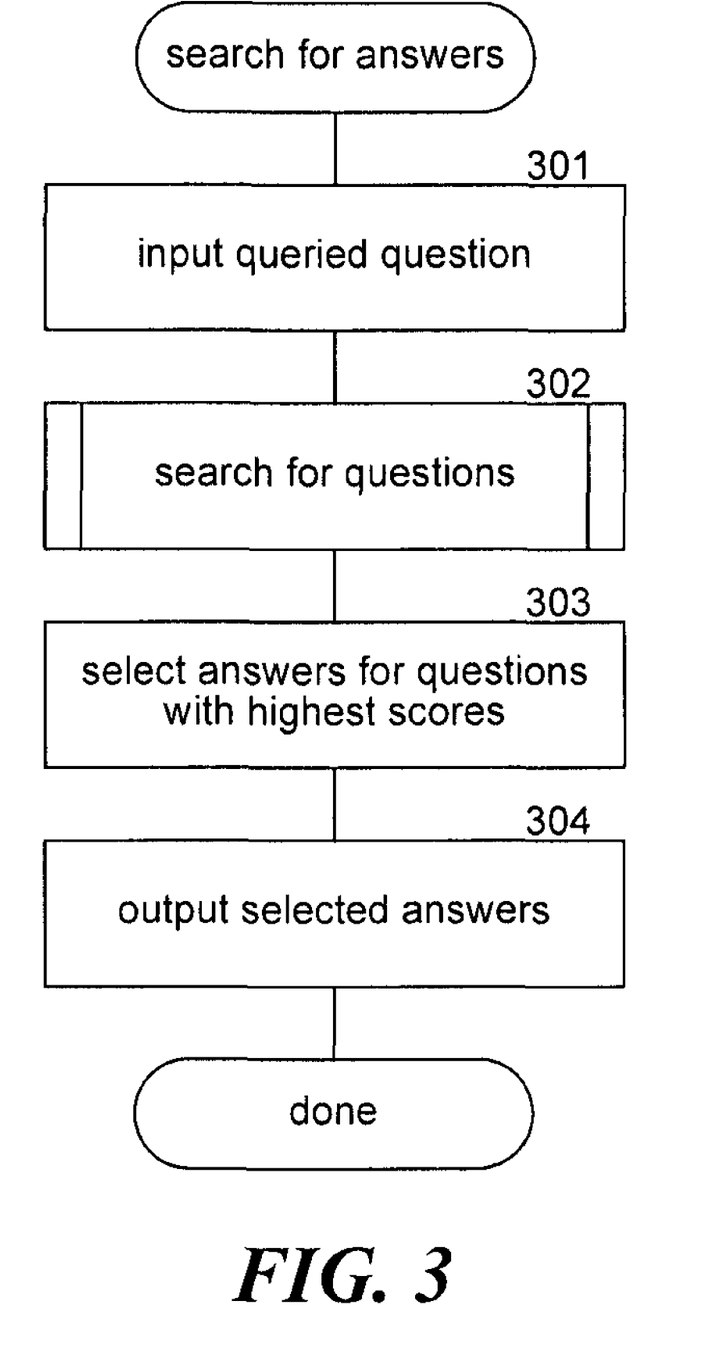
FIG. 3 is a flow diagram that illustrates the processing of a search for answers component of the question search system in some embodiments.

FIG. 3 is a flow diagram that illustrates the processing of a search for answers component of the question search system in some embodiments. The component inputs a queried question, identifies questions of the question/answer store that are relevant to the queried question, and outputs the answers to the identified questions as answers to the queried question. In block 301, the component inputs the queried question. In block 302, the component invokes the search for questions component to search for questions that are relevant to the queried question. In block 303, the component selects the answers for the relevant questions with the highest scores. In block 304, the component outputs the selected answers as answers to the queried question and then completes.

Figure 4:
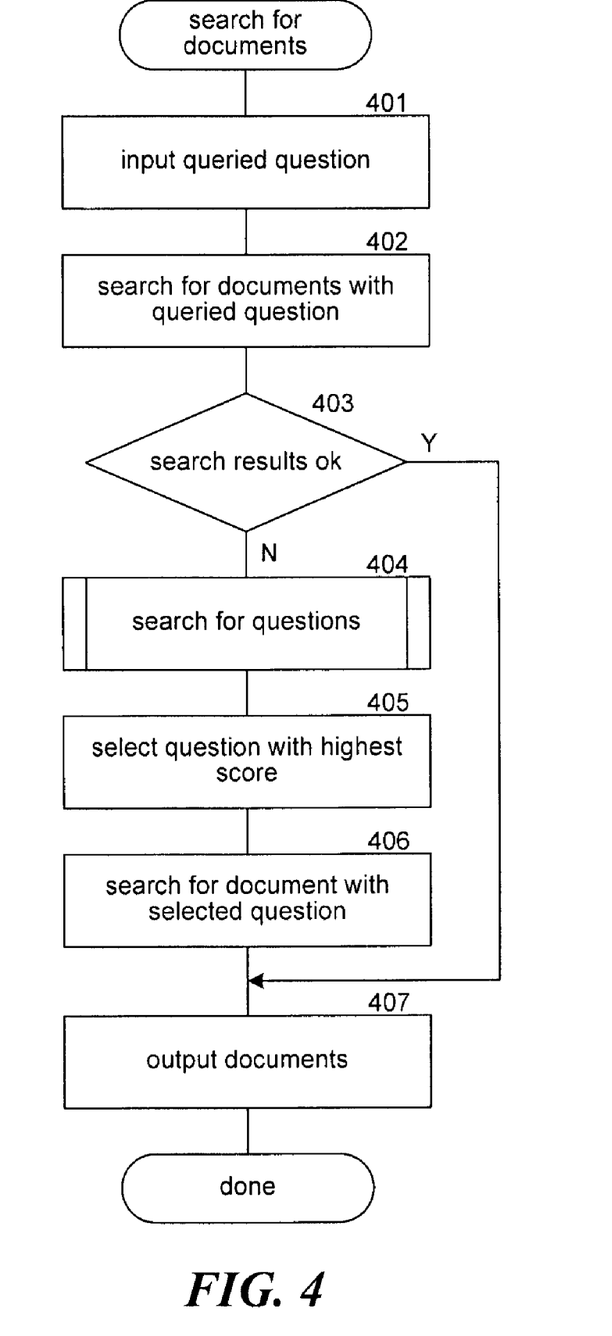
FIG. 4 is a flow diagram that illustrates the processing of a search for documents components of the question search system in some embodiments.

FIG. 4 is a flow diagram that illustrates the processing of a search for documents component of the question search system in some embodiments. The component identifies questions that are relevant to a queried question and submits those questions to a search engine service that generates results for the queried question. In block 401, the component inputs a queried question. In block 402, the component optionally searches for documents based on the queried question. In decision block 403, if sufficient search results are returned, then the component continues at block 407, or else the component continues at block 404. In block 404, component invokes the search for questions component to identify questions relevant to the queried question. In block 405, the component selects the question with the highest relevance score. In block 406, the component searches for documents with the selected question. In block 407, the component outputs the documents as a search result for the queried question and then completes.

Figure 5:
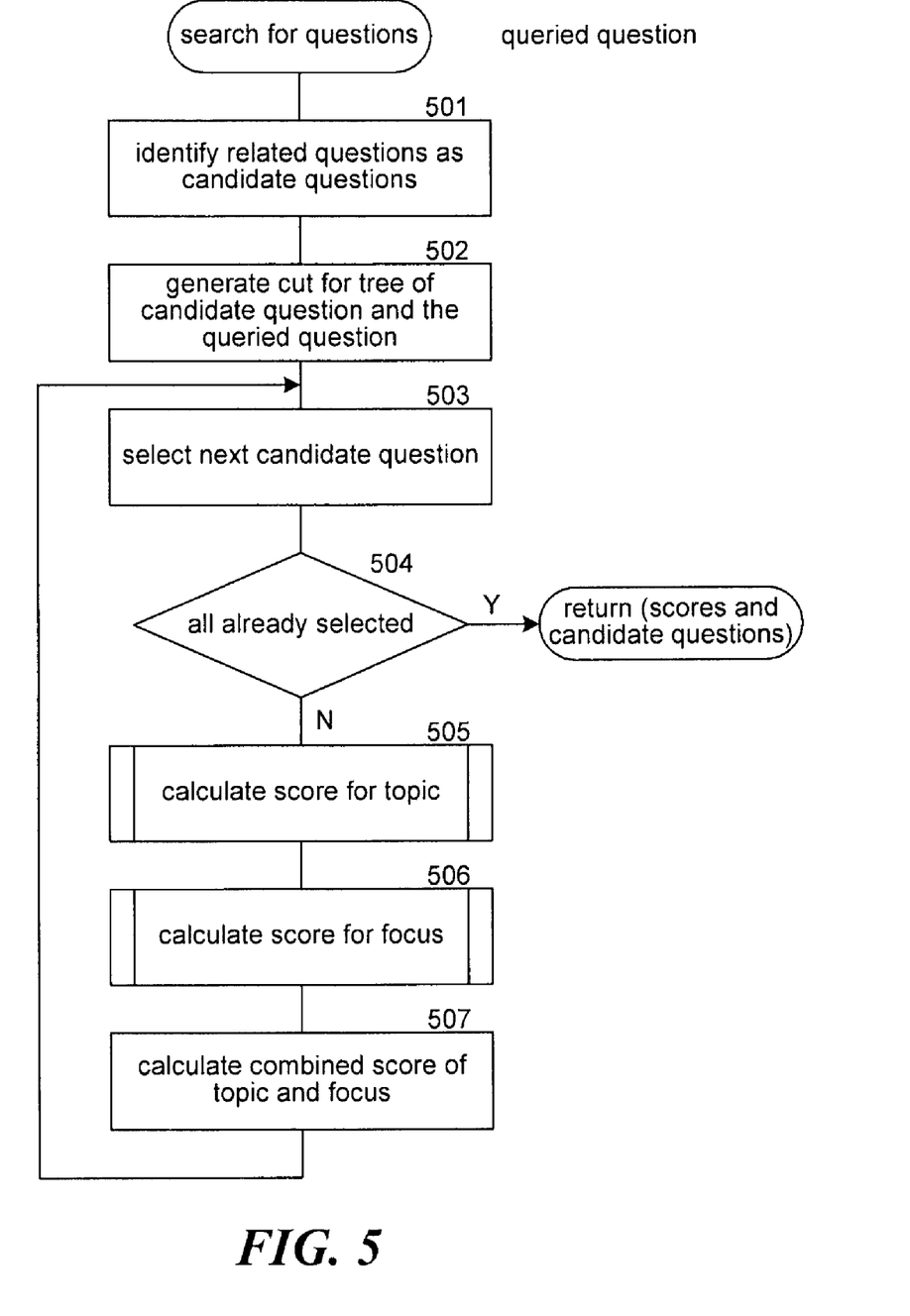
FIG. 5 is a flow diagram that illustrates the processing of the search for questions component of the question search system in some embodiments.

FIG. 5 is a flow diagram that illustrates the processing of the search for questions component of the question search system in some embodiments. The component is passed a queried question and returns the probability scores for candidate questions. In block 501, the component identifies related questions as candidate questions. The component may initially use some techniques such as a vector space model to identify a subset of the questions of the question/answer store that may be related to the queried question. Alternatively, the component may identify all the questions of the question/answer store as candidate questions. In block 502, the component adds the queried question to the question tree for the questions of the question/answer store and then generates a cut of the question tree. In blocks 503-507, the component loops, calculating the score for each candidate question. In block 503, the component selects the next candidate question. In decision block 504, if all the candidate questions have already been selected, then the component returns the scores and the candidate questions, or else the component continues at block 505. In block 505, the component calculates the score for the topic by invoking the calculate score for topic component. In block 506, the component calculates the score for the focus by invoking the calculate score for focus component. In block 507, the component combines the score of the topic and focus as a score for the selected candidate question. The component then loops to block 503 to select the next candidate question.

Figure 6:
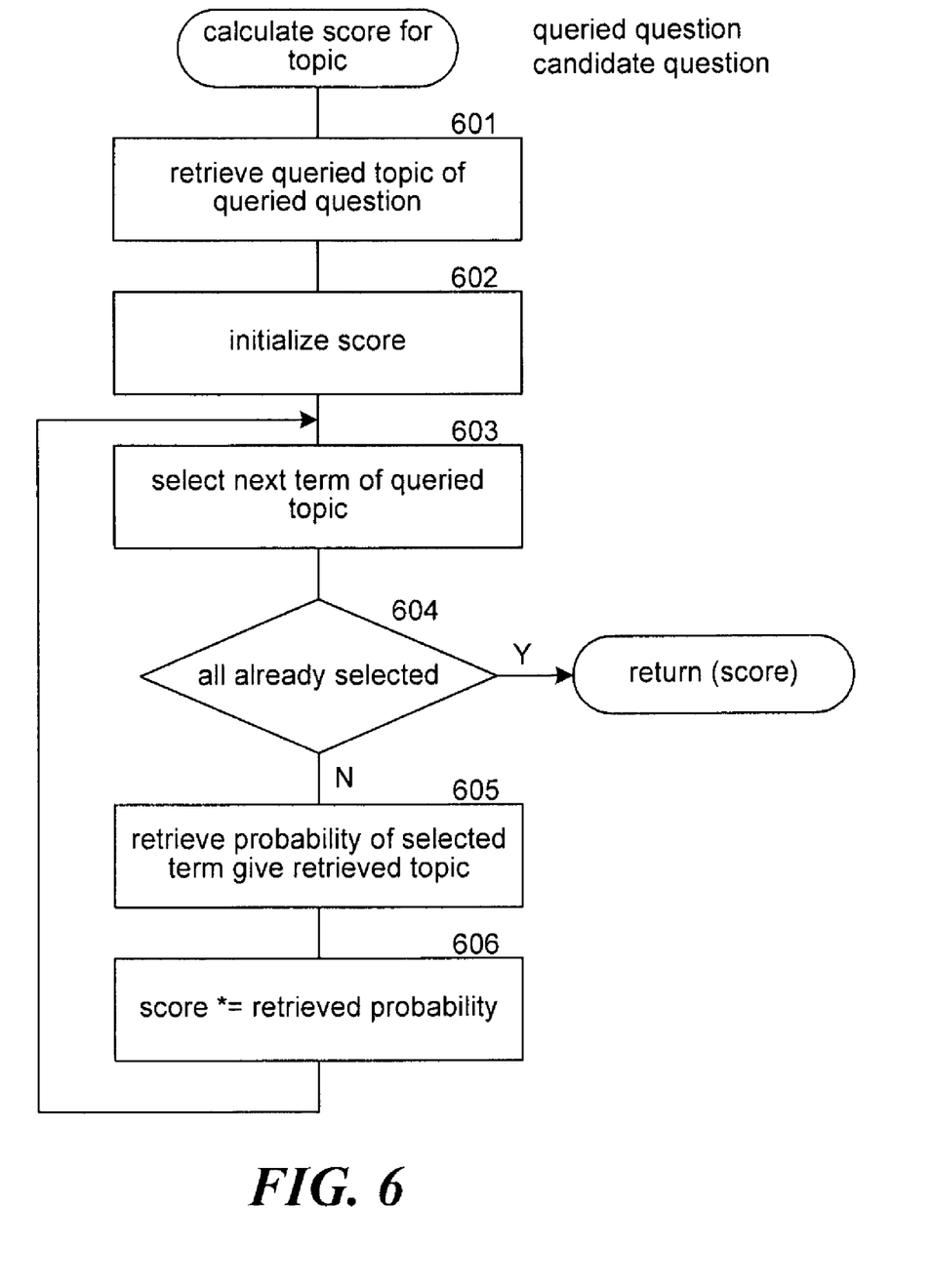
FIG. 6 is a flow diagram that illustrates the processing of a calculate score for topic component of the question search system in some embodiments.

FIG. 6 is a flow diagram that illustrates the processing of a calculate score for topic component of the question search system in some embodiments. The component is passed a queried question and a candidate question and calculates a corresponding topic probability. (The question search system also includes a component to calculate a score for a corresponding focus probability in a similar manner.) In block 601, the component retrieves the queried topic of the queried question. In block 602, the component initializes the score for the topic probability. In blocks 603-606, the component loops, aggregating the probabilities for terms of the queried question. In block 603, the component selects the next term of the queried topic. In decision block 604, if all the terms have already been selected, then the component returns the score, or else the component continues at block 605. In block 605, the component retrieves a probability for the selected term from the topic-by-term probability matrix, which may be smoothed by using a corpus-by-term probability. In block 606, the component multiplies the score by the retrieved probability to give the new aggregated score and then loops to block 603 to select the next term of the queried topic.

Figure 7:
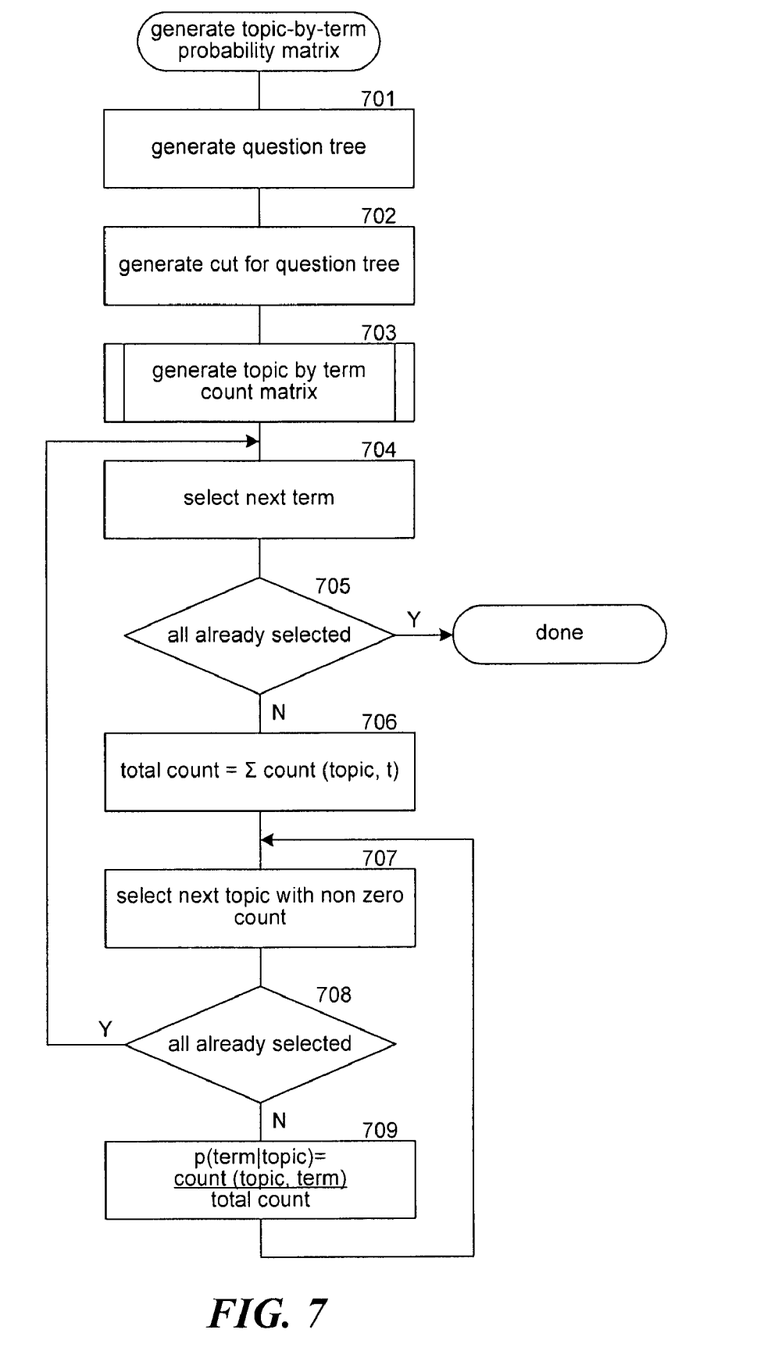
FIG. 7 is a flow diagram that illustrates the processing of a generate topic-by-term probability matrix component of the question search system in some embodiments.

FIG. 7 is a flow diagram that illustrates the processing of a generate topic-by-term probability matrix component of the question search system in some embodiments. The component generates a probability that each term can be generated by a language model of each topic. The component may use a corpus-by-term probability to smooth the topic-by-term probabilities. (The question search system also includes a component that generates a focus-by-term probability matrix in a similar manner.) In block 701, the component generates a question tree of the questions of the question/answer store. In block 702, the component generates a cut for the question tree. In block 703, the component invokes the generate topic-by-term count matrix to count the occurrences of a term within the topics. In blocks 704-709, the component loops, converting the counts to probabilities. In block 704, the component selects the next term. In decision block 705, if all the terms have already been selected, then the component completes, or else the component continues at block 706. In block 706, the component calculates the total count for the selected term. In block 707, the component selects the next topic with a nonzero count for the selected term. In decision block 708, if all such topics have already been selected, then the component loops to block 704 to select the next term, or else the component continues at block 709. In block 709, the component calculates the probability for the selected term and the selected topic by dividing the count by the total count. The component then loops to block 707 to select the next topic with a nonzero count.

Figure 8:
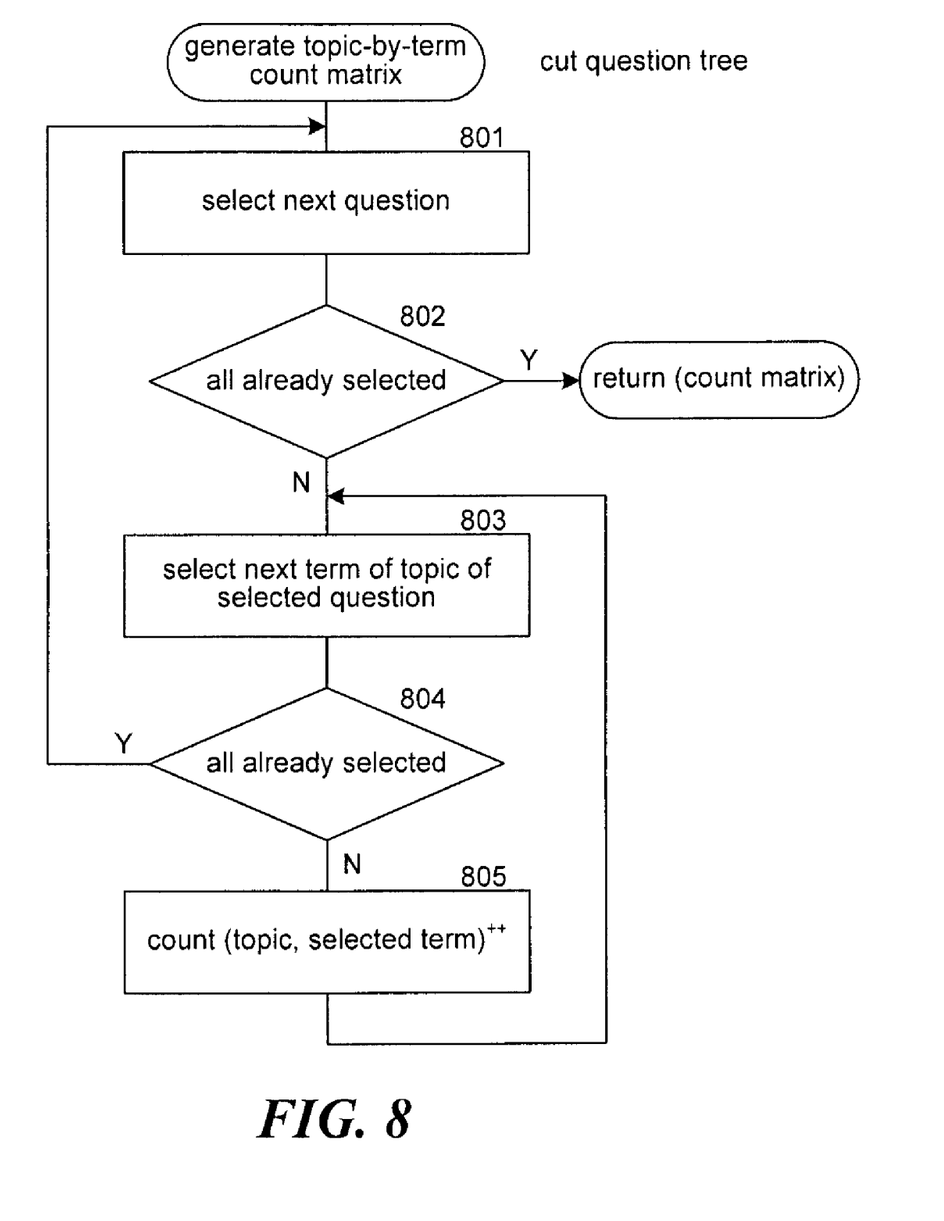
FIG. 8 is a flow diagram that illustrates the processing of a generate topic-by-term count matrix component of the question search system in some embodiments.

FIG. 8 is a flow diagram that illustrates the processing of a generate topic-by-term count matrix component of the question search system in some embodiments. The component is passed a cut of the question tree and generates a topic-by-term count matrix. In block 801, the component selects the next question. In decision block 802, if all the questions have already been selected, then the component returns to the count matrix, or else the component continues at block 803. In block 803, the component selects the next term of the topic of the selected question. In decision block 804, if all such terms have already been selected, then the component loops to block 801 to select the next question, or else the component continues at block 805. In block 805, the component determines the count for the topic of the selected question and the selected term and then loops to block 803 to select the next term.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims. Accordingly, the invention is not limited except as by the appended claims.

We claim:

1. A method in a computing device for identifying questions relevant to a queried question, the method comprising:
   providing a collection of questions having terms, each question having a topic of one or more terms of the question and a focus of one or more terms of the question;
   for each topic and for each term in the questions of the collection, calculating by the computing device a probability of generating that term from a language model of that topic;
   for each focus and for each term in the questions of the collection, calculating by the computing device a probability of generating that term from a language model of that focus;
   receiving a queried question having terms;
   identifying a queried topic and a queried focus of the queried question;
   for each of a plurality of questions of the collection,
      calculating a topic probability of the queried topic as a probability of generating the terms of the queried topic from a language model of the topic of the question;
      calculating a focus probability of the queried focus as a probability of generating the terms of the queried focus from a language model of the focus of the question; and
      generating the probability of the queried question from a language model of the question using the calculated topic probability and the calculated focus probability of the question, the probability indicating the relevance of the question to the queried question.

2. The method of claim 1 wherein calculating of the probabilities is based on an n-gram language model.

3. The method of claim 1 wherein the probability of the queried question is generated from a weighted linear combination of the calculated topic probability and the calculated focus probability.

4. The method of claim 1 wherein calculating the probabilities factors in the probability of the terms occurring in the collection to account for sparseness of a term in the collection.

5. The method of claim 4 wherein the calculated topic probability is a weighted linear combination of an estimated calculated topic probability and the probability of the terms occurring in the collection.

6. The method of claim 1 wherein the topics and focuses of the questions of the collection are identified by generating a question tree of the questions of the collection and generating a cut of the question tree.

7. The method of claim 6 wherein each question is represented by a term chain within the question tree, the topic of a question comprises the terms before the cut of the term chain, and the focus of a question comprises the terms after the cut of the term chain.

8. The method of claim 7 wherein the cut is based on minimum description length.

9. The method of claim 1 wherein calculating the probabilities factors in a translation probability that a term of the queried question is a translation of a term of a question.

10. The method of claim 9 wherein the translation probability is generated from a collection of questions with associated descriptions of each collection.

11. A computer-readable storage medium containing instructions for controlling a computing device to identify questions related to a queried question, by a method comprising:
   providing a collection of questions, each question having terms, each term having a topic and a focus, the topics and focuses of the questions of the collection are identified by generating a question tree of the questions of the collection and generating a cut of the question tree, a topic of a question comprising the terms of the question before the cut and the focus of a question comprising the terms of the question after the cut;
   for each topic and for each term in the questions of the collection, calculating a probability of generating that term from a language model of the topic;
   for each focus and for each term in the questions of the collection, calculating a probability of generating that term from a language model of the focus;
   receiving a queried question having terms;
   identifying a queried topic and a queried focus of the question;
   for each of a plurality of questions of the collection,
      calculating a topic probability of the queried topic that factors in a probability of generating the terms of the queried topic from a language model of the topic of the question, a collection probability of the terms occurring in the collection to account for sparseness of a term in the collection, and a translation probability that a term of the queried question is a translation of a term of a question;
      calculating a focus probability of the queried focus that factors in a probability of generating the terms of the queried focus from a language model of the focus of the question, a collection probability of the terms occurring in the collection to account for sparseness of a term in the collection, and a translation probability that a term of the queried question is a translation of a term of a question; and
      generating a probability that the queried question is from a language model of the question using a weighted combination of the calculated topic probability and the calculated focus probability of the question.

12. The computer-readable storage medium of claim 11 wherein the calculated topic probability is a weighted linear combination of an estimated calculated topic probability and the probability of the terms occurring the collection.

13. The computer-readable storage medium of claim 11 wherein each question is represented by a term chain within the question tree, the topic of a question comprises the terms before the cut of the term chain, and the focus of a question comprises the terms after the cut of the term chain.

14. The computer-readable storage medium of claim 11 wherein the translation probability is generated from a collection of questions with associated descriptions of each collection.

15. A computing device for determining the relevance of questions related to a queried question, comprising:
   a data store storing a collection of questions, each question having a topic of one or more terms and a focus of one or more terms;
   a memory storing computer-executable instructions of:
      a first component that receives a queried question having terms;
      a second component that identifies a queried topic and a queried focus of the queried question; and
      a third component that, for each of a plurality of questions of the collection, generates a score indicating the relevance of the question to the queried question using a language model of the topic of the question and a language model of the focus of the question; and a processor that executes the computer-executable instructions stored in the memory.

16. The computing device of claim 15 wherein each question in the collection has an associated answer and wherein a component selects as answers to the queried question answers to the questions with the highest generated scores.

17. The computing device of claim 15 wherein a fourth component submits a question with a high score to a search engine and wherein the search results of the search engine correspond to search results for the queried question.

18. The computing device of claim 15 wherein the topics and focuses of the questions of the collection are identified by a fourth component that generates a question tree of the questions of the collection and generating a cut of the question tree.

19. The computing device of claim 15 wherein the third component that generates the scores factors in a probability of the terms occurring in the collection to account for sparseness of a term in the collection.

20. The computing device of claim 15 wherein the third component that generates the scores factors in a translation probability that a term of the queried question is a translation of a term of a question.

* * * * *